Figure 1:
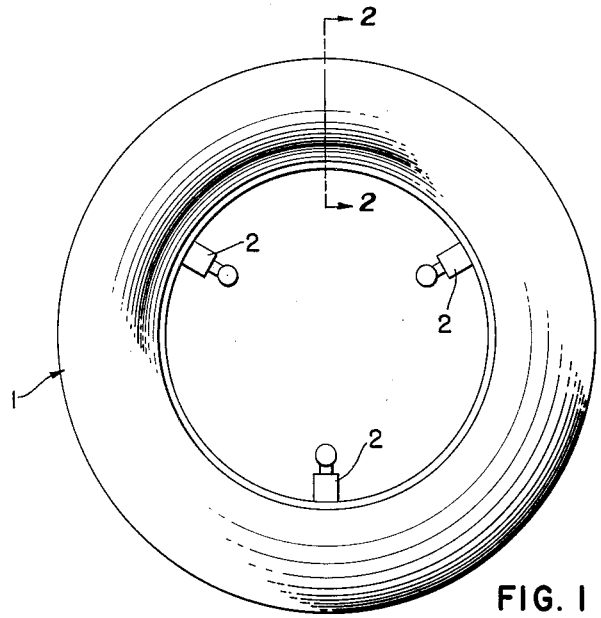

April 22, 1952   R. S. ENABNIT   2,594,139
AIR BAG OR THE LIKE HAVING FREQUENCY INSULATOR THEREIN
Filed March 17, 1949

Inventor
ROBERT S. ENABNIT

By
R. H. Waters
ATTORNEY

Patented Apr. 22, 1952

2,594,139

UNITED STATES PATENT OFFICE 2,594,139

AIR BAG OR THE LIKE HAVING FREQUENCY INSULATOR THEREIN

Robert S. Enabnit, Cuyahoga Falls, Ohio, assignor to Wingfoot Corporation, Akron, Ohio, a corporation of Delaware Application March 17, 1949, Serial No. 81,913

4 Claims. (Cl. 18—45)

1

This invention relates to rubber airbags, such as are used in the vulcanization of pneumatic tires, especially to airbags that are used in vulcanization of tires by high frequency electrical energy.

Heretofore there have been various efforts and suggestions made regarding the vulcanization of rubber articles by high frequency or radio frequency electrical currents. In the attempted curing or vulcanization of tires and other similar articles by high frequency electrical current, the type of an airbag used to force the unvulcanized tire out into engagement with the mold is important and the inclusion of an electrode therein is a problem. This becomes evident from the consideration of the fact that in the ordinary vulcanization process, the toric-shaped unvulcanized tire placed in an annular mold must be forced out against the mold cavity by means of the inflatable, expandable airbag positioned within the unvulcanized tire. Moreover, the airbag is normally inserted into an unvulcanized tire concurrently with the shaping of the tire to toric form from the "flat-band," i. e., cylindrical shape in which it is built. Apparatus performing the dual operation of "bagging," that is, inserting the airbag in the tire, and simultaneously shaping the tire is known in the industry. In the insertion of the airbag into the tire, the airbag is necessarily folded to a considerable extent, and in the removal of the airbag from the vulcanized tire the bag is stretched and bent. The airbag must be adapted to stand rough usage of the indicated type over a protracted period of time and yet retain fluid therein under high pressure.

Furthermore, the airbag is subject to vulcanization temperatures and pressures during its use so that the airbag must be made of such a composition that it does not become oxidized, or overcured, easily and so that it retains its strength over an appreciable life span.

Accordingly, the incorporation of an electrode in an airbag so as not to impair the normal handling and use of the airbag, and at the same time to provide an electrode possessing satisfactory electrical characteristics presents many difficulties. Concentrations of radio frequency current flow with attendant burning or arcing must be avoided, and current flow must be rendered uniform over substantially the entire area of the bag in contact with the tire to be vulcanized.

The general object of the present invention is to provide a novel and improved type of an airbag which is characterized by its ability to facilitate

2 the provision of uniform, rapid cures of pneumatic tires or the like by the use of high frequency electrical energy.

Another object of the invention is to provide an airbag construction which is adapted to have a relatively lengthy life span and to retain its desired strength and flexibility even after appreciable use at vulcanization temperatures.

Another object of the invention is to provide localized insulator strips in an airbag to provide a high radio frequency impedance with a low power factor in certain portions of an airbag for resistance to flow of high frequency electrical current therethrough.

Another object of the invention is to provide an insulation insert made from rubber and especially adapted for use in local areas of an airbag.

Another object of the invention is to compound a rubber material in such a manner as to give it desired high frequency electrical impedance characteristics, with a low power factor, and a flat cure characteristic to permit continued use of such insert at high temperature without changing the physical or electrical properties of same.

Another object of the invention is to provide an airbag for use in the radio frequency cure of pneumatic tires and the like wherein the airbag is of such a composition as to prevent arcing over at the surface of the rubber material.

The foregoing and other objects and advantages of the invention will be made more apparent as the specification proceeds.

The present invention, broadly speaking, relates to a special type of an airbag which has radio frequency conductors embedded therein and which is of substantially uniform wall thickness throughout. The airbag is characterized by the fact that radio frequency insulation strips, made from rubber, are embedded in the side wall and bead engaging portions of the airbag whereby substantially uniform current flow can be obtained between different portions of the tire being vulcanized and the portion of the airbag in substantial radial alignment therewith.

Figure 2:
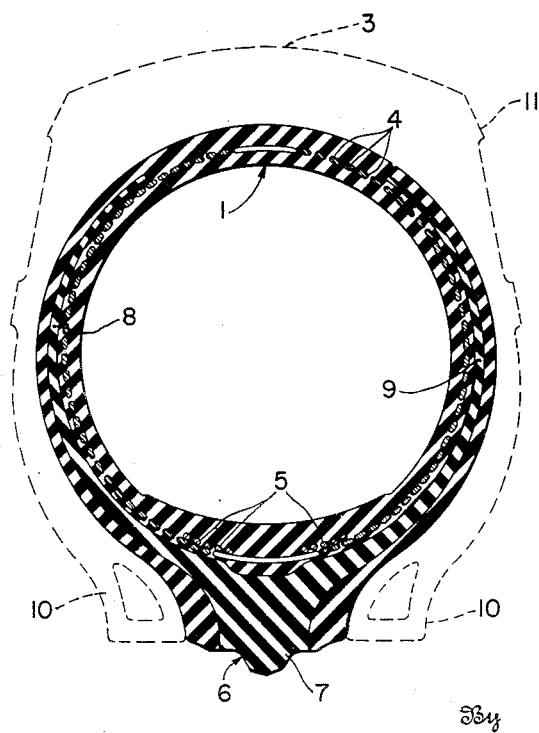

Attention is now directed to the accompanying drawings wherein:

Fig. 1 is an elevation of an airbag embodying the principles of the invention; and Fig. 2 is an enlarged vertical cross section taken on the line 2—2 of Fig. 1 with the position of a vulcanized tire being indicated in dotted lines.

Attention is now directed to the details of the construction shown in the accompanying drawings and these drawings illustrate an airbag 1 made from known and conventional rubber material and which is adapted for use in the vulcanization of pneumatic tires, particularly by the use of radio frequency electrical energy. This airbag 1 is of annular shape and is of generally tubular shape in cross section. Usually a plurality of valve stems 2 are associated with the airbag 1 and extend radially inwardly therefrom from the inner surface of same. Of course, the valve stems 2 have base portions (not shown) that are embedded in the body of the airbag wall.

Fig. 2 of the drawings illustrates in cross section the airbag 1 received within a conventional pneumatic tire 3, indicated in dotted lines.

Fig. 2 further illustrates that the wall of the airbag 1 is of substantially uniform radial thickness throughout any portion thereof. Fig. 2 also illustrates that a plurality of electrical conductors 4 are embedded in the airbag 1 and extend therethrough in any desired manner, in this instance, elliptically-helically around the circumference of the tubular wall of the airbag. If desired, a plurality of terminal conductors in the form of wire braids 5 may be embedded in the airbag 1 and extend circumferentially thereof along the base portion of same in contact with the conductors 4. The wire braids 5 connect to at least one of the valve stems 2 at the base thereof and such valve stem is connected to a source of high frequency energy for supply of electrical energy to the airbag 1.

As a salient feature of the present invention, in order to provide uniform vulcanization of varying section or thickness portions of an unvulcanized rubber tire, the airbag 1 has one or more high frequency high impedance inserts 6 provided therein. The insert 6 shown is annular and is substantially Y-shaped in cross section so that the insert 6 has a relatively thick base 7 and arms 8 and 9 each of which extends from adjacent a bead portion 10 of the tire 3 up to a shoulder portion 11 of the tire 3. That is, the side wall and bead portions of the tire 3 have appreciably less electrical impedance, and are of less physical rubber thickness than the tread portion of such tire whereby special precaution must be taken in vulcanization to avoid over cure of the side wall and bead portions of a tire, or effecting an under cure of the tread portion of the tire. It should be noted that the insert arms 8 and 9 are positioned radially outwardly from the layer formed by the conductors 4 in the airbag 1. Usually the high frequency electrical field during heating extends from the airbag electrode or conductors 4 through the adjacent exterior parts of the airbag and through the tire 3 to the mold (not shown) in which the tire 3 and airbag 1 are inserted as a unit.

As another important feature of the present invention, the particular compounding of the rubber material used in forming the insert 6 is of the following composition:

| | Parts by wt. |
|---|---|
| Rubber (smoked sheet) | 100.00 |
| Calcined magnesia | 75.00 |
| Paraffin | 2.00 |
| Zinc oxide | 3.00 |
| Hydrogenated fish oil | 2.00 |
| Age resistor | 1.00 |
| Wetted mercapto-benzo-thiazole | 1.00 |
| Tetramethylene-thiuram disulphide | 2.00 |
| Sulfur | .50 |

It has been discovered that the foregoing composition gives excellent results when used to provide a high impedance in radio frequency electrical current circuits. Furthermore, this insert has a low power factor so that nominal heating occurs in this material when high frequency electric current is passed through same. Thus, a major portion of the total voltage gradient across the airbag and tire appears across the resistance insert and the voltage gradient over the remainder of the tire and bag in series with it is proportionately reduced. This effectively controls the heating action in that area of the tire. Suitable distribution of the insert material also serves to prevent field concentration in the side wall and bead area of the tire and airbag unit which otherwise would result if unequal impedance zones existed. When considering that the tread portion of the tire and the tread engaging portion of the airbag are in effect in parallel with the side wall of the tire and the side wall engaging portion of the airbag, it will be seen that substantially equal total impedances have to be provided in these different portions of the assembly, or field concentration will occur in the low impedance portion of the assembled unit. In addition to reducing the energy absorption ratio of tire side wall (or bead area) to associated bag and tire parts, the distribution may be made such that the tread and shoulder tire portions together with associated bag offer the lowest impedance of the entire assembly and the resulting field concentration ratio between tread and side wall may be adequately increased to overcome the difference in heating rates introduced by the difference in material volumes.

Regarding the specific composition given above, another desirable factor appears in that no over cure of the airbag stock results even though repeatedly used at vulcanization temperatures. Thus the particular accelerators used and the amounts of the accelerators used seem to give a prompt, normal cure which has a very flat over cure characteristic and will not over cure even though repeatedly heated to vulcanization temperatures. Furthermore, use of the paraffin in the composition appears to provide a high surface resistance for the insert and avoids any arcing between different portions of the rubber forming the airbag 1. Use of the particular accelerators, which are acidic, and the use of the calcined magnesia, which is basic, appears to produce a substantially neutral stock having very desirable aging properties. Any conventional age resisting compound may be used in this composition.

One could not simply obtain the extra impedance desired in the side wall portions of an airbag by increasing the thickness of same because such increased wall thickness would not be suitable for the doubling and folding operations that an airbag must go through in its insertion into and withdrawal from engagement with a pneumatic rubber tire.

In the accompanying specification and claims, the term "rubber" is taken to mean any natural or synthetic material having in general the characteristics of natural rubber. Thus natural and synthetic rubber and rubber-like materials are included in the scope of the present specification.

In considering a diametric section of the airbag 1, it will be seen that the conductors 4 as a whole lie radially outwardly of the insert 6 and the arms 8 and 9 thereof.

It will be appreciated that the particular type of conductors and terminal means used in the airbag 1 may be varied, as desired. Likewise, in some instances the particular size and shape of the insert may be varied. It should be noted that the arms 8 and 9 are of slightly greater radial thickness adjacent the beads 10 of the tire whereby even a smaller voltage gradient is applied across this portion of the time due to the metallic inserts in this section of same. The base 7 of the insert is placed between the tire beads and so aid in retaining the beads in their desired separated positions.

The airbag of the invention may be of any desired shape and size and in some instances may comprise only a sectional airbag for use in tire repairs. Likewise, the airbag can be used with any desired frequency for use in the high frequency vulcanization of rubber articles. Other shapes of inserts could be used, such as two separate strips that would not extend down between the beads 10, as does the insert base 7. Other high frequency high impedance compounds may be used, when desired, to form the inserts which bond to the remainder of the stock used in forming the airbag 1.

While certain representative embodiments and details have been shown for the purpose of illustrating the invention, it will be apparent to those skilled in this art that various changes and modifications may be made therein without departing from the spirit or scope of the invention.

What is claimed is:

1. An airbag for use in the high frequency vulcanization of a pneumatic tire and including a toric tubular rubber body having inner and outer wall portions constructed from rubber having no more than medium impedance and about a medium power factor, a radio frequency insulation insert of rubber having extremely high impedance and low power factor and having a Y-shape in cross section embedded in the air bag body between the inner and outer wall portions, the arms of the Y being of gradually decreasing thickness outwardly from the stem of the Y and lying between the inner and outer wall portions on the air bag body, the stem of the Y of the insert being relatively short and wide and separating the outer wall portions of the air bag body adjacent the bead portion of the body, and a radio frequency electrode comprising at least one radially inwardly extending terminal and flexible wire conductors embedded in the wall of the air bag body radially outwardly of the insert in the portions of the airbag in which the insert and the electrode lie in adjacent relation but excluding the radially inwardly extending terminal of the electrode.

2. An airbag for use in the high frequency vulcanization of a pneumatic tire and including a toric tubular rubber body having inner and outer wall portions constructed from rubber having no more than medium impedance and about a medium power factor, a radio frequency insulation insert of rubber having extremely high impedance and low power factor and having a Y-shape in cross section embedded in the air bag body between the inner and outer wall portions, the arms of the Y being of gradually decreasing thickness outwardly from the stem of the Y and lying between the inner and outer wall portions on the air bag body, and a radio frequency electrode comprising at least one radially inwardly extending terminal and flexible wire conductors embedded in the wall of the air bag body radially outwardly of the insert in the portions of the airbag in which the insert and the electrode lie in adjacent relation but excluding the radially inwardly extending terminal of the electrode.

3. An airbag for use in the high frequency vulcanization of a pneumatic tire and including a toric tubular rubber body having inner and outer wall portions constructed from rubber having no more than medium impedance and about a medium power factor, a radio frequency insulation insert of rubber having extremely high impedance and low power factor embedded in the air bag body between the inner and outer wall portions, the insert being of gradually decreasing thickness from the bead areas of the air bag towards the shoulder areas and terminating adjacent the shoulder areas of the air bag, and a radio frequency electrode comprising at least one radially inwardly extending terminal and flexible wire conductors embedded in the wall of the air bag body radially outwardly of the insert in the portions of the airbag in which the insert and the electrode lie in adjacent relation but excluding the radially inwardly extending terminal of the electrode.

4. An airbag for use in the high frequency vulcanization of a pneumatic tire and including a toric tubular rubber body having inner and outer wall portions constructed from rubber having no more than medium impedance and about a medium power factor, a radio frequency insulation insert of rubber having extremely high impedance and low power factor and having a Y-shape in cross section embedded in the air bag body between the inner and outer wall portions, the arms of the Y terminating adjacent the shoulder areas of the bag and lying between the inner and outer wall portions of the air bag body, and a radio frequency electrode comprising at least one radially inwardly extending terminal and flexible wire conductors embedded in the wall of the air bag body radially outwardly of the insert in the portions of the airbag in which the insert and the electrode lie in adjacent relation but excluding the radially inwardly extending terminal of the electrode.

ROBERT S. ENABNIT.

REFERENCES CITED

The following references are of record in the file of this patent:

UNITED STATES PATENTS

| Number | Name | Date |
|---|---|---|
| 2,451,992 | Te Grotenhuis | Oct. 19, 1948 |

FOREIGN PATENTS

| Number | Country | Date |
|---|---|---|
| 332,891 | Great Britain | July 24, 1930 |